United States Patent [19]
Ginetti et al.

[11] Patent Number: 5,638,290
[45] Date of Patent: Jun. 10, 1997

[54] METHOD FOR ELIMINATING A FALSE CRITICAL PATH IN A LOGIC CIRCUIT

[75] Inventors: Arnold Ginetti, Antibes; Christophe Gauthron, La Colla sur Loup, both of France

[73] Assignee: VLSI Technology, Inc., San Jose, Calif.

[21] Appl. No.: 417,622

[22] Filed: Apr. 6, 1995

[51] Int. Cl.$^6$ .................. G06F 15/00; G01R 31/28
[52] U.S. Cl. .................. 364/489; 364/488; 364/490; 364/580; 371/22.2; 371/25.1; 371/28; 29/847; 29/850
[58] Field of Search ................. 364/488, 489, 364/490, 578, 580, DIG. 1, DIG. 2; 371/22.2, 28, 61, 25.1, 23, 48, 40.2; 324/73.1; 29/847, 407, 850

[56] References Cited

U.S. PATENT DOCUMENTS

| | | | |
|---|---|---|---|
| 4,831,725 | 5/1989 | Dunham et al. | 29/847 |
| 5,003,487 | 3/1991 | Drumm et al. | 364/488 |
| 5,113,352 | 5/1992 | Finnerty | 364/489 |
| 5,177,440 | 1/1993 | Walker, III et al. | 364/578 |
| 5,251,147 | 10/1993 | Finnerty | 364/489 |
| 5,355,321 | 10/1994 | Grodstein et al. | 364/488 |
| 5,363,313 | 11/1994 | Lee | 364/489 |
| 5,396,435 | 3/1995 | Ginetti | 364/488 |
| 5,402,357 | 3/1995 | Schaefer et al. | 364/488 |
| 5,426,591 | 6/1995 | Ginetti et al. | 364/488 |
| 5,448,497 | 9/1995 | Ashar et al. | 364/488 |

*Primary Examiner*—Kevin J. Teska
*Assistant Examiner*—Jacques Louis-Jacques
*Attorney, Agent, or Firm*—Burns, Doane, Swecker & Mathis, LLP

[57] ABSTRACT

A method for removing the critical false paths takes place during logic optimization. It is based on a path-constrained redundancy removal algorithm. This path-constrained redundancy removal algorithm automatically finds that a path node does not affect the behavior of the path output and so determines a critical path. This method is iteratively repeated for as long as this critical path is false.

4 Claims, 4 Drawing Sheets

METHOD FOR ELIMINATING A FALSE CRITICAL PATH IN A LOGIC CIRCUIT

DESCRIPTION

Background of the Invention

This invention relates to a method for eliminating a false critical path in a logic circuit.

In a logic circuit, incompatible false timing paths are paths for which the propagation conditions of the signals along the paths are incompatible.

FIG. 1 shows a conventional logic circuit. This figure shows two multiplexers I1 and I2 connected in series, which are controlled by a logic signal S.

The delays in brackets are the delays for the logic signals to come respectively to points A, B or C. These delays are due to not shown, upstream logic circuits.

Using a commercial time verifier, the reported critical path starts on input connector B and ends on output connector OUT. However the critical sensitizable path is from input connector C to output connector OUT due to the inhibiting effect of the S signal on some paths.

Reporting path B→OUT as the critical path creates two problems:

it makes the designer believe that the circuit is much slower than it really is;

it makes the logic optimizer built-in timing verifier believe that the circuit is much slower than it really is; the logic optimizer will thus over-constrain constrain some combinational block during the optimization, increasing the area of the circuit.

A false path only creates these problems when it is critical.

We can deal with false timing paths in two different ways:

improving timing verifiers: this is the methodology followed by some research teams in the universities;

removing false paths during the logic optimization: so far, no real solution has been proposed for addressing the elimination of false timing paths during the logic optimization.

However the following processes, which are commonly used by a lot of available synthesis tools, may accidentally decrease the number of false paths.

Obviously, if the combinational block of FIG. 1 is completely flattened, a conventional minimization algorithm will automatically find out that the output OUT is not dependent on the input node "0" of the multiplexer I1. The combinational function OUT will thus be simplified automatically removing the false path. The main drawback of this method is that it is not exhaustive: some combinational blocks may be so huge that even if it is possible to completely flatten them, it would be totally impossible to deal with such flattened networks in any minimization algorithm.

A conventional redundancy removal algorithm automatically finds that an internal node does not affect the behavior of any of the output node of a block. In the above example shown in FIG. 1, a conventional redundancy removal algorithm would thus establish that the input node "0" of the multiplexer I1 does not affect the behavior of the output node OUT. It would thus automatically remove the logic driving this node. However, once again, this method is not exhaustive. The redundancy removal algorithm will not detect anything when the redundancy is "partial" that is when the redundant node is affecting some of the outputs such as in the FIG. 2.

In this case, the redundancy removal algorithm will see that the input node "0" of the multiplexer I1 is affecting the behavior of at least one output connector (namely OUT2) and will thus not do anything.

We will now consider more specifically two prior art documents.

A first prior art article entitled "Is redundancy necessary to reduce delay ?" by Kurt Keutzer, Sharad Malik and Alexander Saldanha (IEEE Transactions on Computer-Aided Design, vol. 10, no. 4, April 1991) says that logic optimization procedures principally attempt to optimise three criteria: performance, area, and testability. In this article the authors describe an algorithm that takes as input a combinational circuit and returns an irredundant circuit that is as fast. They demonstrate the utility of this algorithm on a well-known circuit, the carry-skip adder, and present a novel irredundant design of that adder. As their algorithm may either increase or decrease circuit area, they leave unresolved the question as to whether every circuit has an irredundant circuit that is at least as fast and is of equal or lesser area.

A second prior art document entitled "Circuit Structure Relations to Redundancy and Delay" by Alexander Saldanha, Robert K. Brayton and Alberto L. Sangiovanni-Vincentelli (IEEE Transactions on Computer-Aided Design of integrated Circuits and Systems, vol. 13, no. 7, July 1994) overcomes the main bottlenecks of the KMS algorithm (described by Keutzer, Malik and Saldanha in the above mentioned article) by providing an efficient single-pass algorithm to simultaneously remove all long false paths from a given circuit. They achieve this by relating a circuit structure property based on path lengths to the testability (redundancy) and delay. The application of this algorithm to a variety of related logic synthesis problems is described.

SUMMARY OF THE INVENTION

It is therefore an object of the present invention to improve these prior art methods for removing the false critical timing paths.

This method for removing false critical path in a logic circuit comprises a step for determining a possible critical path, this step taking place during logic optimization.

This step is based on a path-constrained redundancy removed algorithm which automatically finds that a path node does or does not affect the behavior of the path output and so determines a critical path. This step is iteratively repeated as long as the new obtained critical path is false.

More precisely the method according to the invention comprises the steps of:

running timing verification;

searching a critical path;

extracting a critical cone as a combinational network;

using a path-constrained redundancy removal algorithm checking for any redundancy occurring on the critical path on the extracted combinational network;

if a redundancy occurs performing the following steps:

duplicating the critical path from its primary input upto a false critical node, collapsing the duplicate critical path upto a false critical node by propagating 0 or 1 constant from the input of the critical path as far as possible.

Advantageously in the second step the critical cone is defined as the cone of logic ending on the critical path output and starting on primary inputs.

The combinational network has:

n primary inputs;

m outputs: one output for the end point of the critical path plus an output for each multi-fanout node on the critical path.

In the fourth step, if such a redundancy occurs the algorithm also returns the location of the first node on the critical path from which the behavior of the input node of the critical path does not propagate anymore on the critical path, this first node being called the false critical node.

The main advantage of the method according to the invention for removing the false critical timing path during the logic optimization are:

the conventional timing verifier will report the real speed of the design rather than a false slower speed;

during timing optimization, the logic optimization algorithms will produce smaller designs; indeed, as the critical false paths are removed, the logic optimizer timing verifier sees the design as being faster and will thus under-constrain the logic.

Further features and advantages of the invention will become more readily apparent from the following detailed description, when taken in conjunction with the accompanying drawings.

DESCRIPTION OF THE PREFERRED EMBODIMENT

Figure 1:
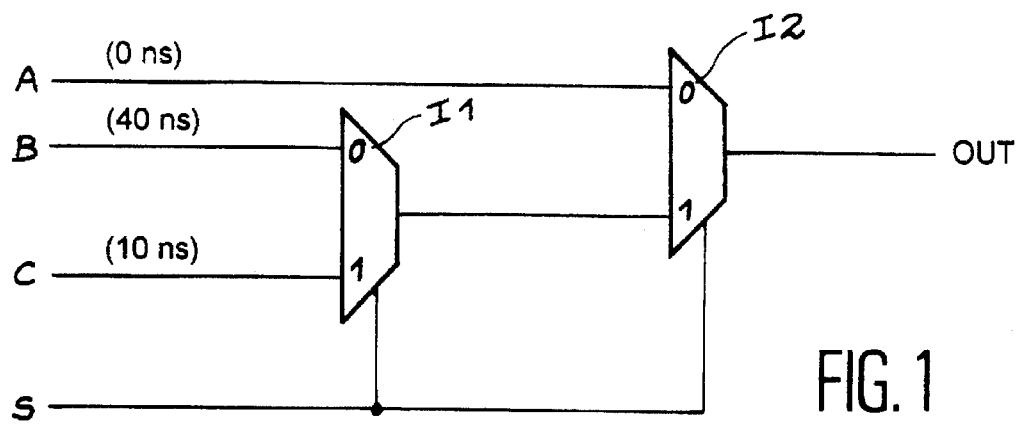
FIG. 1 and FIG. 2 show two conventional logic circuits in which typical false timing paths are present.
Figure 2:
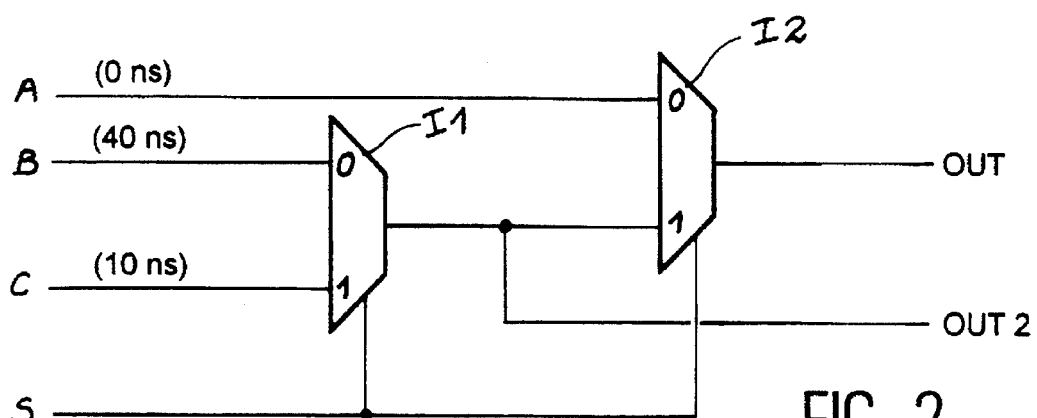

Hereunder a logic circuit, as shown in FIG. 2, will be considered to illustrate the inventive method step.

The invention method is based upon a new path-constrained redundancy removal algorithm. This path-constrained redundancy removal algorithm automatically finds that a path node does not affect the behavior of the path output and so determines a false path.

Figure 3:
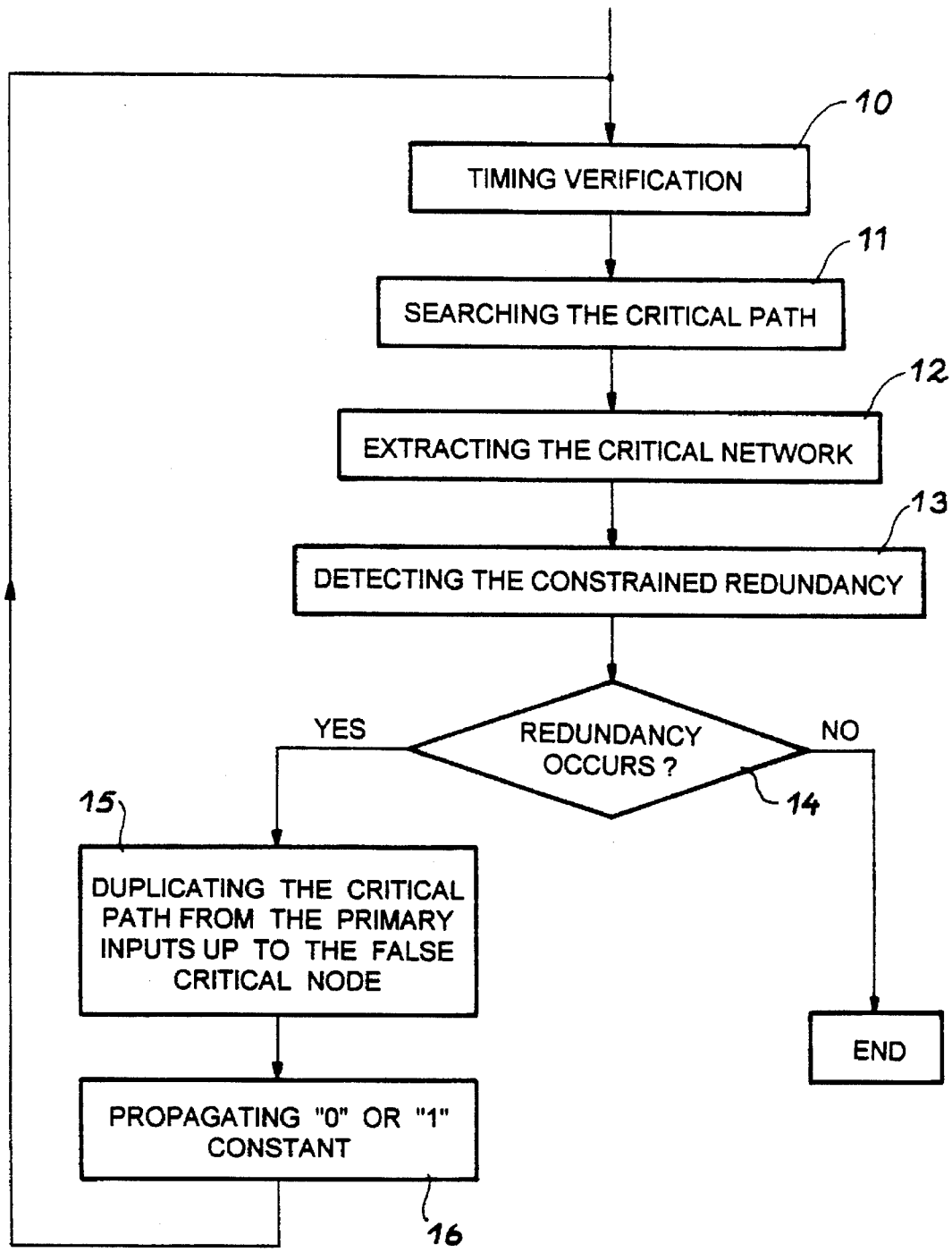
FIG. 3 shows the algorithm according to the method of the invention.

As shown in FIG. 3 the method according to the invention comprises the following steps:

1) run timing verification (box 10);

2) search a critical path (box 11);

3) extract a critical cone as a combinational network (box 12).

The critical cone is defined as the cone of logic ending on the critical path output and starting on primary inputs. This network has:

n primary inputs, m outputs (one output for the end point of the critical path plus an output for each multi-fanout node on the critical path which does not reconverge into the cone itself);

4) using a path-constrained redundancy removal algorithm, check for any redundancy occurring on the critical path on the extracted combinational network (box 13); if such a redundancy occurs, the algorithm also returns the location of the first node on the critical path from which the behavior of the input node of the critical path does not propagate anymore on the critical path. This first node is called the "false critical node";

5) if a redundancy occurs (test 14) perform the following steps;

6) duplicate the critical path from its primary input upto the false critical node (box 15);

7) collapse the duplicate critical path upto the false critical node by propagating 0 or 1 constant from the input of the critical path as far as possible (box 16).

As shown in FIG. 3 this method is iteratively repeated for as long as the newly obtained critical path is false (test 17).

In FIGS. 4–7, the delays in brackets at the outputs are the delays due to not shown, downstream logic circuits.

Figure 4:
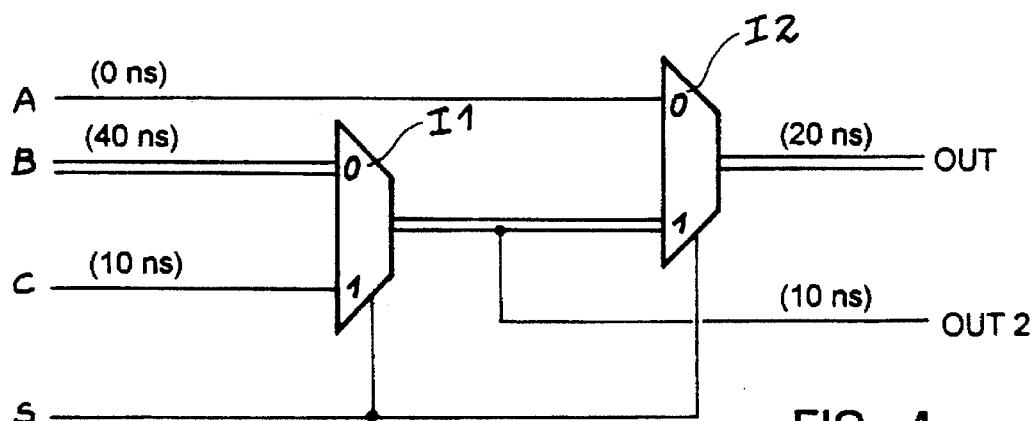
FIGS. 4, 5, 6, 7, 8 and 9 show the different steps of the method of the invention relative to the logic circuit according to FIG. 2.

Steps 1 and 2, concerning the search of the critical path (indicated by two parallel lines), are shown in FIG. 4.

Figure 5:
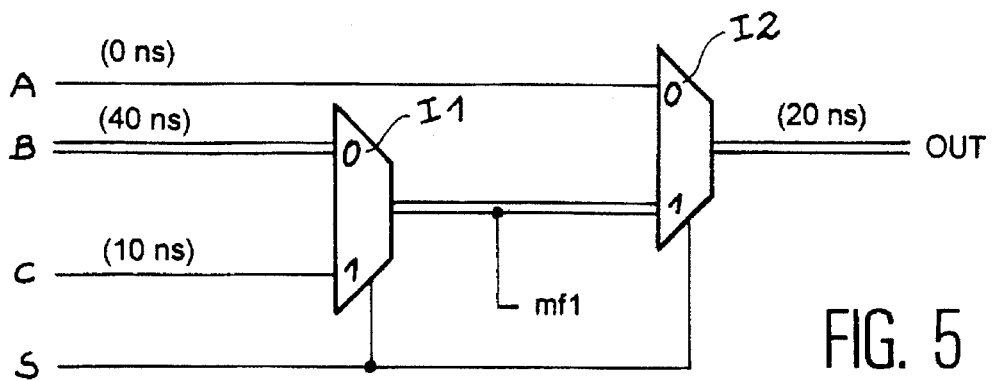

Step 3, concerning the extraction of the critical network, is shown in FIG. 5. The primary inputs are A, B, C and S. The critical path output is "OUT". The critical path multi-fanout node output is denoted "mf1".

Figure 6:
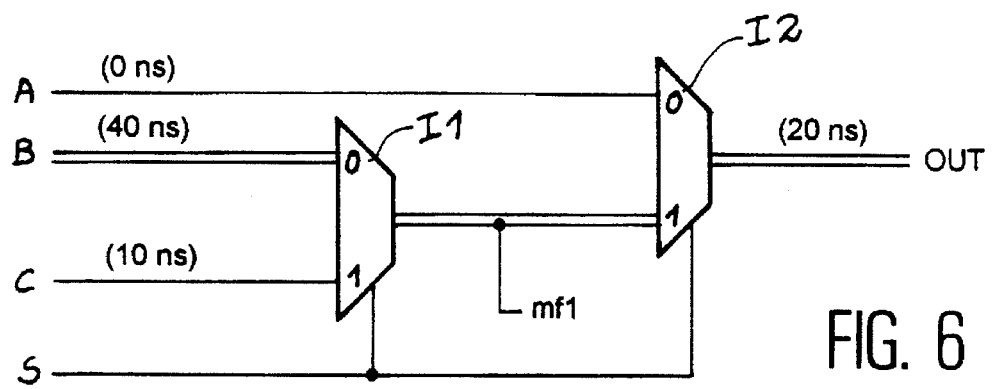

Step 4 concerning the detection of the constrained redundancy, is shown in FIG. 6. The "OUT" constrained redundancy removal algorithm returns "yes" and specifies that output "mf1" is the false critical node.

Figure 7:
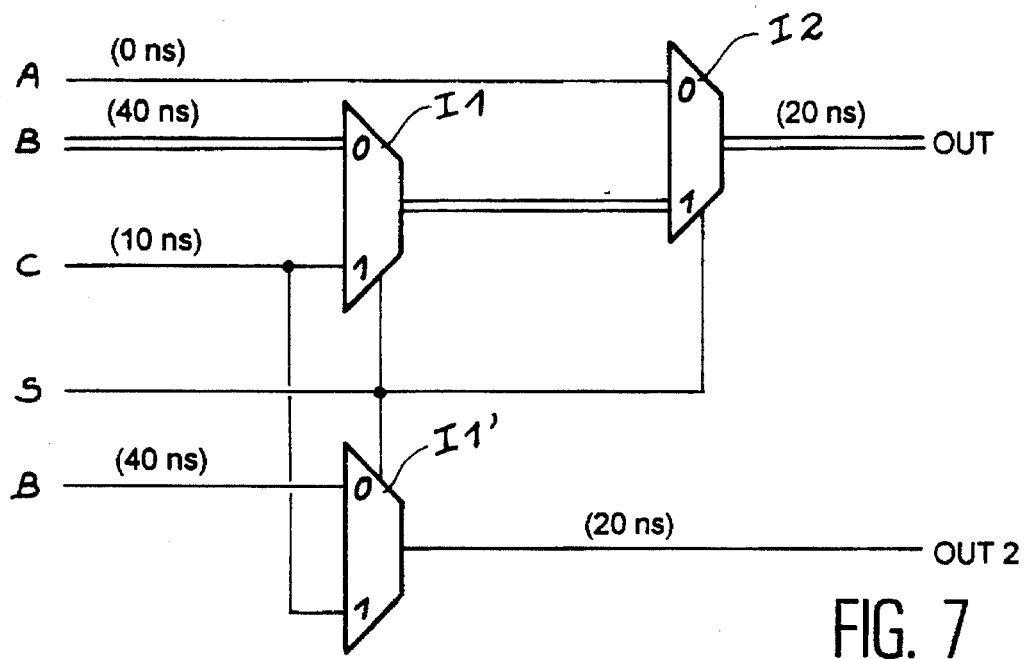

Step 6, concerning the duplication of the critical path from the primary inputs up to the false critical node, is shown in FIG. 7. The multiplexer I1 is duplicated into a new multiplexer I1'.

Figure 8:
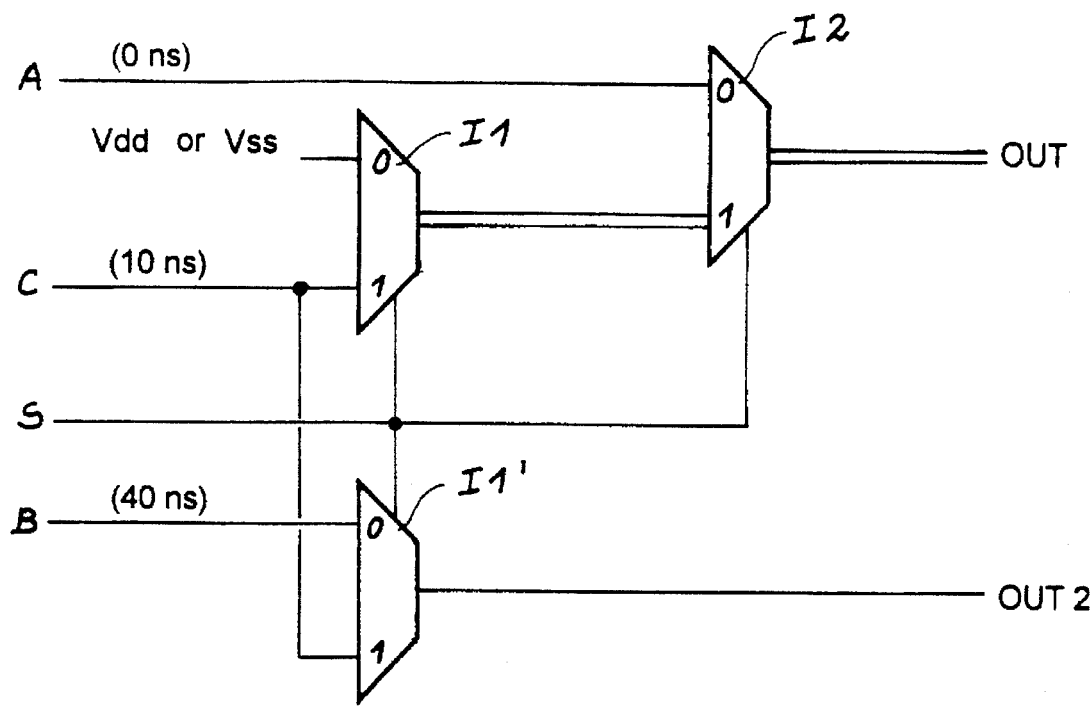

Step 7, concerning the propagation of "0" or "1" constant (Vdd or Vss signal), is shown in FIG. 8.

Figure 9:
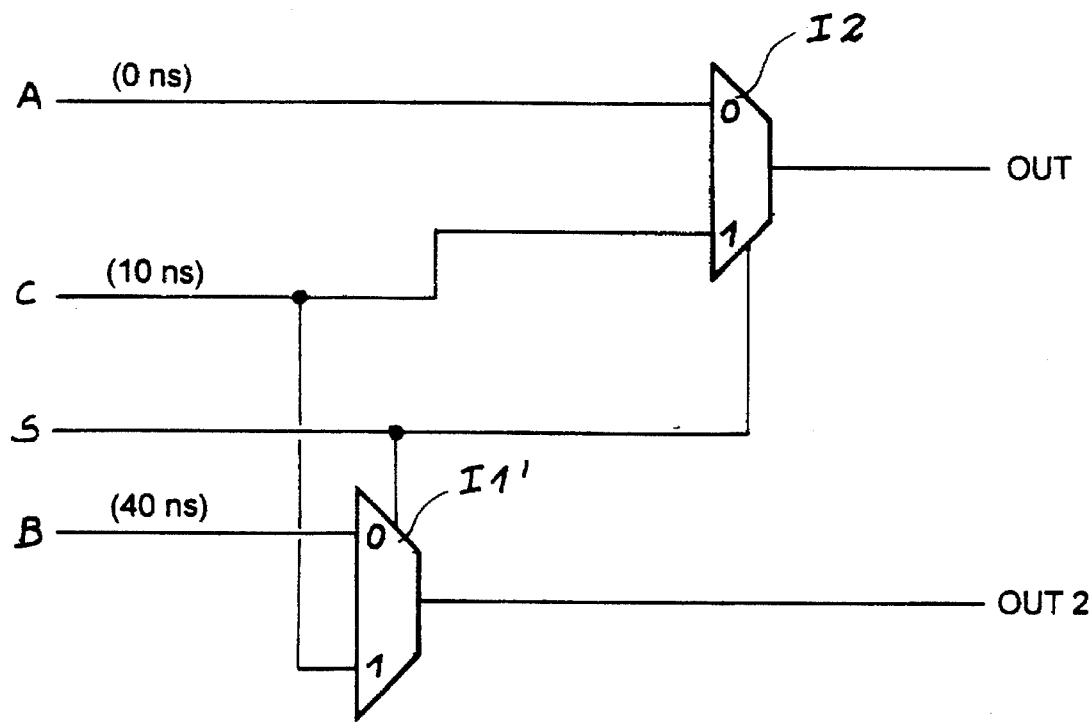

FIG. 9 illustrates a simplification of the logic shown in FIG. 8. It concerns the removal of the non-sensitizable logic.

As can be seen, at the end of the fifth step, the critical path is no longer a false path. A conventional timing verifier will thus report as the critical path the path B→OUT2 which is the true critical timing path.

The main advantages of removing the false critical timing path during logic optimization are:

the conventional timing verifier will report the real speed of the design rather than a false slower speed;

during timing optimization, the logic optimization algorithm produces smaller designs; indeed, as the critical false paths are removed, the logic optimizer timing verifier sees the design as being faster and thus under-constrains the logic.

Although the invention has been described with reference to a single embodiment, the scope of the invention is not limited thereto and in fact the scope and spirit of the invention are defined by the appended claims and equivalents thereof.

What is claimed is:

1. A method for removing a false critical path in a logic circuit during logic optimization, the method comprising the steps of:

running a timing verification on the logic circuit using a timing verifier to determine a critical path;

searching for the critical path;

extracting a critical cone from the critical path as a combinatorial network;

checking for any redundancy occurring on the critical path on the extracted combinatorial network using a path-constrained redundancy removal algorithm, wherein the path-constrained redundancy removal algorithm automatically finds that a path node does or does not affect the behavior of the critical path output and so determines whether the critical path is a false critical path;

if the redundancy occurs, performing the following steps:
duplicating the critical path from a primary input up to a false critical node; and collapsing the critical path up to a false critical node by propagating 0 or 1 constant from the input of the critical path as far as possible, thereby removing the false critical path.

2. The method according to claim 1, wherein the critical cone is a cone of logic ending on the critical path output and starting on primary inputs of the critical path.

3. The method according to claim 1, wherein the combinatorial network comprises n primary inputs and m outputs, the m outputs including one output for an end point of the critical path and one output for each multi-fanout node on the critical path.

4. The method according to claim 1, wherein if the redundancy occurs, the path-constrained redundancy removal algorithm returns a location of a first node on the critical path from which the behavior of the input node of the critical path does not propagate any more on the critical path, this first node being the false critical node.

* * * * *